United States Patent
Simon et al.

(10) Patent No.: US 9,864,067 B2
(45) Date of Patent: Jan. 9, 2018

(54) METHOD FOR DETERMINING A CURRENT POSITION OF A MOTOR VEHICLE IN A GEODETIC COORDINATE SYSTEM AND MOTOR VEHICLE

(71) Applicant: AUDI AG, Ingolstadt (DE)

(72) Inventors: Christina Simon, Ingolstadt (DE); Florian Mickler, Ingolstadt (DE); Andreas Tollkühn, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/023,175

(22) PCT Filed: Sep. 18, 2014

(86) PCT No.: PCT/EP2014/002533
§ 371 (c)(1),
(2) Date: Mar. 18, 2016

(87) PCT Pub. No.: WO2015/039755
PCT Pub. Date: Mar. 26, 2015

(65) Prior Publication Data
US 2016/0231432 A1    Aug. 11, 2016

(30) Foreign Application Priority Data
Sep. 20, 2013    (DE) .................. 10 2013 015 705

(51) Int. Cl.
*G01S 19/49*    (2010.01)
*G01C 21/28*    (2006.01)

(52) U.S. Cl.
CPC .............. *G01S 19/49* (2013.01); *G01C 21/28* (2013.01)

(58) Field of Classification Search
CPC ....................................................... G01S 19/49
See application file for complete search history.

(56) References Cited

U.S. PATENT DOCUMENTS 9,335,171 B2 *  5/2016  Iida ..................... G01S 19/40
2014/0095067 A1    4/2014  Iida et al.

FOREIGN PATENT DOCUMENTS

CN    1965247          5/2007
DE    33 10 111 A1    9/1984
(Continued)

OTHER PUBLICATIONS

International Preliminary Report on Patentability (Chapter II) from International Application No. PCT/EP2014/002533, dated Dec. 4, 2015.
(Continued)

*Primary Examiner* — Adam Tissot
*Assistant Examiner* — Michael Berns
(74) *Attorney, Agent, or Firm* — Alston & Bird LLP

(57) ABSTRACT

Method for determining a current position (5) of a motor vehicle (6) in a geodetic coordinate system from a time series of first geodetic position data (2) recorded particularly by a position sensor (8) associated with a global navigation satellite system, and proper motion data (3) recorded by at least one proper motion sensor (9), wherein the position is determined by applying a transformation into the geodetic coordinate system to the displacement vector of the motor vehicle (6), which is derived from the most current proper motion data (3) starting from a reference time to which the transformation relates, wherein the transformation is determined in the context of a regression analysis as optimal mapping of a progression of displacement vectors determined over a defined time period onto a progression of the position data (2) determined for the same time period.

22 Claims, 2 Drawing Sheets

(56) References Cited

FOREIGN PATENT DOCUMENTS

Figure 1:
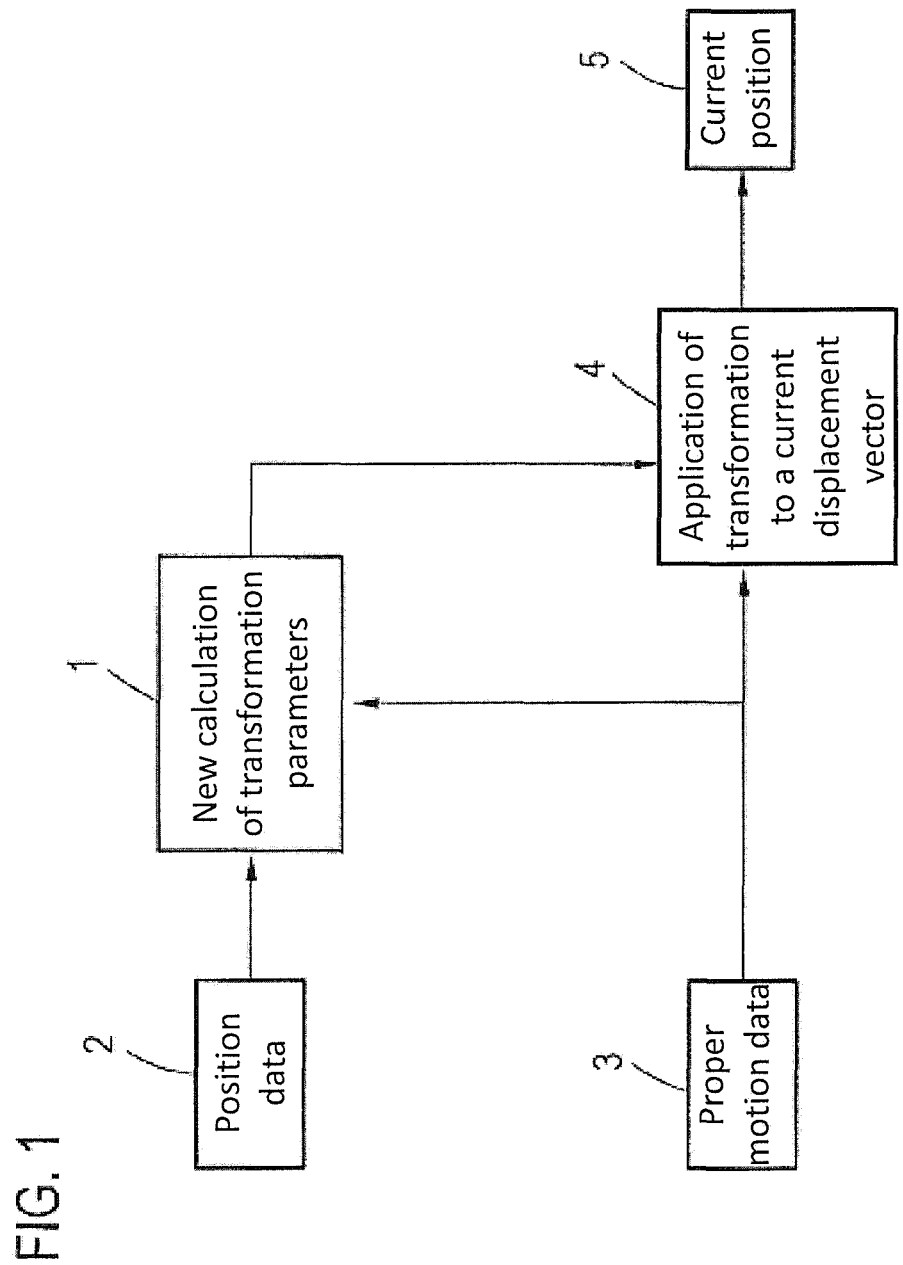

FR          2684213         5/1993
GB       2 126 040 A        3/1984
WO    WO 2013/027404 A1    2/2013

OTHER PUBLICATIONS

International Search Report and Written Opinion from International Application No. PCT/EP2014/002533 dated Dec. 1, 2015.
Wendel J.; "Integrierte Navigationssysteme: Sensordaten, GPS and Inertial Navigation"; Chapter 6; Oldenbourg Wissenschafts Verlag; 2007.
Farrell J.; "The Global Positioning System & Inertial Navigation"; Chapters 3, 4 and 7; McGraw-Hill Companies, Inc.; 1998.
Fischler, Martin A. and Bolles, Robert C.; "Random Samples Consensus: A Paradigm Model Fitting with Applications to Image Analysis and Automated Cartography"; Commun. ACM, 24 (6): 381-395, 1981.
Office Action for corresponding Chinese Application No. 201480051264.8 dated Sep. 29, 2016.

\* cited by examiner

METHOD FOR DETERMINING A CURRENT POSITION OF A MOTOR VEHICLE IN A GEODETIC COORDINATE SYSTEM AND MOTOR VEHICLE

CROSS REFERENCE TO RELATED APPLICATIONS

This application is a national stage 371 application of International Application No. PCT/EP2014/002533 filed Sep. 18, 2014, which claims priority to and the benefit of German Application No. 102013015705.6, filed Sep. 20, 2013, the entire contents of which are hereby incorporated by reference.

The invention relates to a method for determining a current position of a motor vehicle in a geodetic coordinate system from a time series of first geodetic position data recorded particularly by a position sensor associated with a global navigation satellite system, and proper motion data recorded by at least one proper motion sensor. The invention further relates to a motor vehicle.

In modern motor vehicles, the most precise possible position information is useful for numerous motor vehicle systems, in particular for a navigation system, in which in some cases high-precision information can be present, relating to obstacles, for example. Therefore, the goal is to determine the position of the motor vehicle as precisely as possible. For this purpose, it has been proposed to use position sensors that enable localizing the motor vehicle on the basis of a global navigation satellite system (GNSS), for example, the GPS (Global Positioning System). Other possibilities for position localization in a geodetic coordinate system provide for detecting street signs whose exact position is known and/or for recording the motor vehicle by means of an external sensor, for example, a camera, which transmits the corresponding position data in the geodetic coordinate system via a car-2-X communication, for example, after the exact position of at least the external sensor is in fact known. However, often such position determination systems do not have the required precision and, in particular, they exhibit inaccuracies that deviate from a Gaussian error distribution.

It has been proposed, therefore, to use other sensor data recorded in the motor vehicle, in order to be able to determine a more precise current position of a motor vehicle therefrom. In particular, in the present context, proper motion data of at least one proper motion sensor are available, that enable the updating of all the movements of the motor vehicle over a predetermined time window. Often proper motion data contain a position increment, therefore a direction and a length of a vector between two acquisitions of sensor data using the proper motion sensor. Proper motion sensors can be, for example, wheel rpm sensors that make it possible to measure a distance that has been traveled via an assumed or an also known wheel circumference, or can comprise an inertial sensor system.

Approaches involving the coupling of GNSS with a proper motion estimation, in order to improve the localizing of the motor vehicle especially in an urban area, have already been proposed in the prior art. Here, state estimators, for example, Kalman filters, and derivatives of state estimators are used, on the topic of which a reference is made, for example, to the standard works by J. Wendel, "Integrierte Navigationssysteme: Sensordaten, GPS and Inertiale Navigation," Oldenbourg Wissenschafts Verlag, 2007, and J. Farrell, "The Global Positioning System & Inertial Navigation," McGraw-Hill Companies, Inc., 1998. However, the use of such state estimators has numerous disadvantages. On the one hand, the internal consistency of the proper motion estimation, and therefore of the ego trajectory, is hardly taken into account at all, since the history is only included in the state covariance matrix. In addition, the known methods are highly dependent on the quality of the confidences that are usually included in the delivery of the position sensors for GNSS. The use of state estimators moreover assumes that the errors present have a Gaussian distribution, which is not always applicable in the case of GNSS. When processing the position data, particularly GPS data, an elaborate compensation for latency is needed. A detection of outliers occurs at best statically.

Therefore, the invention is based on the problem of presenting a method for an improved, in particular, more precise determination of a current position of a motor vehicle, which takes into consideration the special properties of the data sources.

For the solution to this problem, in the case of a method of the type mentioned at the start, it is provided according to the invention that the position is determined by applying a transformation into the geodetic coordinate system to the displacement vector of the motor vehicle, which is derived from the most current proper motion data starting from a reference time to which the transformation relates, wherein the transformation is determined in the context of a regression analysis as optimal mapping of a progression of displacement vectors determined over a defined time period onto a progression of the position data determined for the same time period.

Therefore, it is proposed to use a transformation onto a displacement vector which corresponds to the integrated proper motion data starting from a reference time, therefore indicating how far in what direction the motor vehicle has effectively moved since the reference time (and thus starting from a reference position). For example, a summing of all the measured position increments starting from the reference time can occur, which moreover does not have to be fixed, since, in order to vary the transformation, the displacement vector from the old reference time to the new reference time (or the associated positions) merely needs to added as translation. However, it is in any case not necessary to keep all the proper motion data forever, since the displacement vector used for the last time step merely needs to be increased by a newly added position increment.

The transformation is determined in the context of a regression analysis. The method presented here solves the problem of a sensor data fusion therefore in that, by using the means of regression analysis, the proper motion trajectory is fit into the position data, particularly the GPS measurement points. The procedure for the transformation can be optimally estimated from this adaptation. Here, one uses the fact that the proper motion trajectory, as described by the proper motion data, is precise over the short term, which means that the error increases slowly over time. The position data present in the geodetic coordinate system, particularly GPS position data, are recorded in a long-term stable manner, which means that it is assumed that the expected value of the position data corresponds to the true value.

The sensor data fusion thus described by means of regression has numerous advantages in comparison to the known methods. Thus, there is greater robustness with respect to errors that are not in a Gaussian distribution, since they are not included as prerequisite. In addition, the robustness with respect to imprecise confidences also increases. Moreover, the procedure enables an adaptive outlier detection, to be discussed in further detail, wherein, with each new calculation of the transformation, which is typically done cyclically, a new selection is possible. Moreover, the internal consistency of the ego trajectory is inherently preserved.

The parameters of the transformation here can also be conceived of as parameters that describe a current position model. Therefore, the position data and the proper motion data that describe the trajectory of the motor vehicle are regularly combined in order to obtain, from a model estimation, parameters of a transformation which can then always be applied to the current displacement vector when new proper motion data are available, so that an improved, more precise geodetic position can be obtained.

A GPS sensor can be used as position sensor for the determination of the position data, wherein, naturally, other position sensors for other global navigation satellite systems (GNSS) can also be used. However, the position data can also be obtained from other sources, for example, by detecting road signs or other objects whose geodetic position is known, or, on the other hand, by using external sensors which can deliver their observations to the motor vehicle, for example, via Car-2-X communication. In this way certain position data are improved by the method according to the invention, by carrying out the proper motion coupling via the regression. In the process, the position data determine, as described, a transformation by means of which the displacement vectors can be transferred into the geodetic coordinate system.

As proper motion sensor for determining the proper motion data, it is also possible to use, among other devices, an rpm sensor of at least one wheel, wherein the movement direction can be determined additionally by various other sensors and/or vehicle systems. Methods for recording proper motion data are known in principle in the prior art and can also be used in the context of the present invention.

Advantageously, a transformation comprising at least one rotation and at least one translation is used. Here, it is preferable if the progression of the proper motion data is kept as rigid as possible, which is to say a single rotation of the same angle is applied as transformation parameter to all the displacement vectors of the progression, and the same translation is used for all the displacement vectors of the progression, wherein the entries of the translation vector then represent additional transformation parameters. A global translation and a global rotation are thus part of the transformation.

A particularly advantageous design of the present invention provides for the transformation to also include, in addition, a scaling of the displacement vector. Such a scaling factor, which can also be applied directly to the position increments, covers inaccuracies in the determination of the proper motion data, insofar as the route lengths are concerned, for example, an erroneous assumption of a tire circumference and the like. Furthermore, the fact that the surface of the earth is not flat is taken into in this way, since a usually two-dimensional geodetic coordinate system is used.

In general, it is possible to provide that the transformation is determined in an optimization method that minimizes the deviation of the progressions. Since proper motion data can be recorded more frequently than position data, it is advantageous to determine a displacement vector for each time at which a position datum is also present in the position data, and to consider only those grid points that are determined by the times of the position data recording. Here, an interpolation of proper motion data can be considered. An optimal transformation can now be found by determining, for a currently considered transformation, a transformed displacement vector for each of these times. From this results the deviation of the progressions by consideration of the difference between the position datum and the transformed displacement vector the same time point. A target function to be minimized can be determined by a combination of these individual errors for the different times, wherein a linear or a nonlinear optimization can occur.

It is advantageous if, as starting position for the optimization method, the progression of the displacement vectors is set up so that the first displacement vector corresponds to the first position datum and/or the last position vector corresponds to the first position datum and/or the last position vector corresponds to the last position datum. Thus, a good starting position is already available for finding the minimum, that is to say the best agreement of the progressions. If scaling factors are used as parameters of the transformation, it is moreover also possible to set up the progression of the displacement vectors so that the first displacement vector corresponds to the first position datum and simultaneously the last displacement vector corresponds to the last position datum.

Preferably, in the optimization methods, differently weighted deviations at certain times of the progression are considered. For example, this means that weighting factors can also flow into the above described formation of a target function, making it possible, for example, for the deviation at each time to have a differently weighted influence. For this purpose, it is possible to provide that points measured earlier in time are weighted less strongly than points measured later in time. The reason for this is the fact that the measurement error frequently depends on the proper speed of the motor vehicle and on the yaw rate, so that it is more advantageous to weight newer points more strongly than older points. However, it is optionally possible to provide, in addition, that the weighting occurs with a weighting factor depending on a confidence value associated with each position datum. GNSS position sensors usually also deliver, in addition to the position data, a confidence value, which represents the estimated precision of the position determination. This can also be used as weighting for the error vector. Furthermore, it is conceivable to make the weighting factors depend directly on the yaw rate or another dynamic travel parameter of the motor vehicle, for example, also on the speed. Thus, the state of the vehicle can be taken into consideration in the recording of the position data.

A particularly advantageous design of the present invention provides that, before and/or during the determination of the transformation using a RANSAC algorithm, outliers in the progression of the position data are identified and not taken into consideration in the determination of the transformation. Outliers in GNSS position data can be triggered, for example, by reflections of signals emitted by satellites on objects in the surrounding area of the motor vehicle and the like, thus usually in an urban environment. This can result in position data that deviate clearly from the other position data contained in the progression. Such outliers can be found, for example, using the RANSAC algorithm which is known in the prior art. A description of the RANSAC algorithm can be found, for example, in the seminal article by Martin A. Fischler and Robert C. Bolles, "Random sample consensus: a paradigm for model fitting with applications to image analysis and automated cartography," Commun. ACM, 24 (6): 381-395, 1981.

A refinement of the method provides that the parameters describing the transformation are smoothed via several consecutive determinations of the transformation, in particular by the formation of a sliding average. Therefore, a smoothing of the progression of the transformation parameters is conceivable, which can be achieved, for example, by a state estimate. In the process, it is assumed that the transformation rules can be considered to be stationary or at least to be slowly changing, so that suddenly occurring jumps in transformation parameters, for example, which are unwanted, should be suppressed. Thus, in this case, the results of the regression are thus kept for several consecutive regression analyses and further used for the smoothing, for example, by formation of a sliding average.

As already indicated, the transformation can be newly determined in cyclic repetitions, particularly with the frequency at which new position data are available, or at whole-number fractions thereof. Thus, for example, in the case of a position sensor which delivers position data at a frequency of 10 Hz, every 0.1 s a new determination of the transformation can occur. However, it is not absolutely necessary, at the time of each obtention of a newly measured position datum, for example, by the position sensor, to carry out a new regression analysis; instead, it has been found to be sufficient to repeat the determination of the transformation at greater time intervals, that is to say in the above-mentioned example in particular at a frequency of 5 Hz, 1 Hz, 0.5 Hz or similar whole-number fractions. Thus, a regular new determination is obtained, without resulting in an excessively strong load, resulting from an excessively frequent new determination, on the executing control apparatus, for example.

The defined time period can be selected to have a length of 20 to 40 seconds, preferably 30 seconds, or can be selected so that 100 to 500 times at which position data were recorded are in it. The defined time period here preferably contains a predetermined number of times at which position data were recorded. If the length of the predetermined time period is considered to be 30 seconds, this corresponds to a predetermined number of 150 times, in the case of a frequency of 5 Hz, at which the position data are delivered, and to a predetermined number of 300 times, in the case of a frequency of 10 Hz, at which the position data are delivered.

It is particularly preferable if, with the determination of the transformation, at least one parameter of a sensor model of the proper motion sensor, in particular a parameter describing the measurement error, is also determined. In addition, it is thus also possible to optimize simultaneously parameters of a sensor model, particularly of an error model for the sensor. For example, it can be known that, for the measurement error, there is a linear correlation with the speed, which concerns the proper motion sensor. Therefore, this measurement error can also be estimated from a sensor model (error model), so that the preprocessing of the proper motion data can be improved, if there is also an optimization in terms of the description of the error by the parameters in the sensor model.

In addition to the method, the invention also relates to a motor vehicle comprising a control apparatus designed for carrying out the method according to the invention. The motor vehicle further has a first data source for position data, in particular a position sensor of a GNSS, and a second data source, in particular comprising at least one proper motion sensor, for the proper motion data. In the context of a sensor fusion, the position data and the proper motion data are used in order to enable an improved position determination. All the explanations pertaining to the method according to the invention can be applied similarly to the motor vehicle according to the invention by means of which the same advantages can therefore be obtained.

Additional advantages, features and details of the present invention result from the embodiment examples described below and in reference to the drawing.

Figure 2:
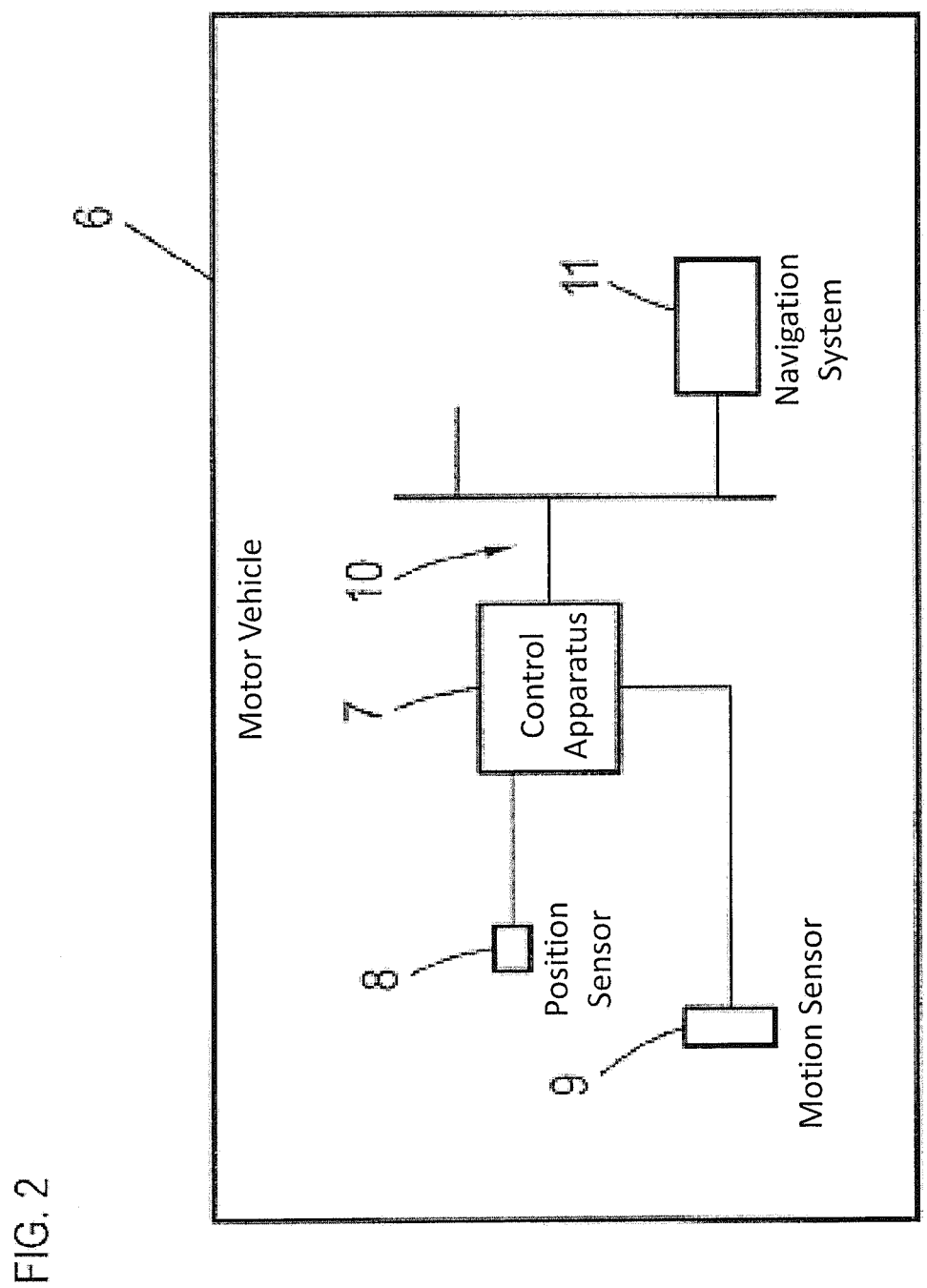

FIG. 1 shows a diagram for explaining the method according to the invention, and FIG. 2 shows a motor vehicle according to the invention.

FIG. 1 shows a diagram for carrying out the method according to the invention. In the end, this method takes place on two different time scales, since a new calculation of transformation parameters occurs in a step 1 from position data 2 and proper motion data 3 only every 5 seconds, while the application of the transformation to a current, clearly more frequently available displacement vector from a reference time on occurs clearly more frequently in step 4, for example, at a frequency of more than 10 Hz. Summarized in brief, the method in step 1, therefore, determines a transformation which relates to a reference time, and a displacement vector which describes the position variation since the reference time, transforms into the global geodetic coordinate system, which then takes place in step 4, so that a high-precision current position 5 can be obtained. This will now be explained in further detail below.

In step 1, a predetermined, defined time period is considered, which in the present case contains N=150 times at which position data were recorded. Since the position sensor, in this embodiment example a GPS sensor, delivers position data with a frequency of 5 Hz, the predetermined time period therefore has a length of 30 seconds. The vector of a position datum in the geodetic coordinate system at time i will be referred to with $p_i$ below. At each time i, a displacement vector $v_i$ can be determined from the proper motion data 3 by integration of the proper motion, relative to the reference time of the null vector. Thus, there are N pairs ($p_i$, $v_i$) for each time. In the context of a regression analysis, a transformation to be applied to the displacement vectors $v_i$ is now to be determined, so that the progression formed by the transformed displacement vectors $\tilde{v}_i$ corresponds as precisely as possible to the progression determined by the position data $p_i$.

However, first the position data $p_i$ are examined for outliers using a RANSAC algorithm; these outliers are removed from further consideration.

In the present embodiment example, the following transformation is assumed, for the purpose of determining transformed displacement vectors $\tilde{v}_i$:

$$\tilde{v}_i = aR(\varphi)v_i + o$$

$R(\varphi)$ here refers to a rotation about an angle $\varphi$, which is to be applied to all $v_i$. $o$ describes a fixed translation for all $v_i$. The parameter a is a scaling factor, which can compensate for deviations of the earth from a flat plane and also for deviations in the determination of the proper motion data, for example, as a result of an erroneously assumed tire circumference in an rpm sensor of a wheel. Therefore, in the present case the transformation has four parameters, namely the rotation angle $\varphi$, the scaling factor a, and the two coordinate values of the translation $o$.

For each point i in the progression (which in the end means for each time), a deviation $e_i$ can be determined.

$$e_i = p_i - \tilde{v}_i$$

From this, a target function E to be minimized can be defined.

$$E = \Sigma w_i * |e_i|$$

Before the target function E, which describes the deviation of the transformed progression $\tilde{v}_i$ from the progression $p_i$ defined by the position data, is then minimized, a suitable starting point is selected, in this case so that the first displacement vector $v_1$ corresponds to the first position datum $p_1$ and the last displacement vector $v_N$ corresponds to the last position datum $p_N$, which is unquestionably possible due to the use of the scaling vector a.

As a result, an optimization method is carried out, which minimizes the target function E and thus determines an optimal estimation for the parameters of the transformation, that is to say for a, φ, and o. As can be obtained from the above-indicated formula for the target function E, the latter can contain weighting factors $e_i$. A weighting here occurs primarily so that older value, that is to say the earlier points of the progression, are weighted less strongly than newer values; however, a confidence value present for each position datum and included with the delivery of the position sensor is also included in the weighting.

In parallel with the determination of the parameters of the transformation, at least one parameter of a sensor model, which describes a measurement error, is moreover also optimized for the at least one proper motion sensor, in order to enable in the future an improved preprocessing of the proper motion data 3.

The parameters of the transformation are newly determined cyclically, in the present case every 5 seconds, wherein, in addition, a smoothing of both the parameters of the transformation and also of the parameter of the sensor model occurs. This occurs primarily by the formation of a suitable average via several regressions, that is to say several temporally consecutive executions of step 1. However, this is optional or can be carried out only for some of the determined parameters.

The current transformation parameter can be used in step 4, in order to use in each case the current proper motion data 3 for the determination of the improved current position 5.

FIG. 2 shows a basic diagram of a motor vehicle 6 according to the invention. Said motor vehicle comprises a control apparatus 7 in which the method according to the invention can be implemented. For this purpose, the control apparatus 7 receives position data 2 of a position sensor 8, here a GPS sensor, just as it receives proper motion data 3 of at least one proper motion sensor 9. In the process, proper motion data are usually formed by combining data from several sensors, for example, for determining the distance traveled by a wheel, wherein a certain tire circumference is assumed, and for determining direction from data of a compass and/or inertial sensor system.

The determined current position 5 can be output to a bus system 10 of the motor vehicle 6, for example, a CAN bus, where it can be further used, for example, by a navigation system 11 or other vehicle systems not shown in further detail here.

The invention claimed is:

1. A system for determining a current position of a motor vehicle in a geodetic coordinate system from a time series of first geodetic position data, the system comprising: a position sensor associated with a global navigation satellite system for recording the time series of first geodetic position data; at least one proper motion sensor for recording proper motion data; and a control apparatus, wherein the position is determined by the control apparatus by applying a transformation including at least one rotation and at least one translation into the geodetic coordinate system to a displacement vector of the motor vehicle, which is derived from the most current proper motion data starting from a reference time to which the transformation relates, wherein the transformation is determined in the context of a regression analysis as optimal mapping of a progression of displacement vectors determined over a defined time period onto a progression of the position data determined for the same time period, and wherein the transformation comprises a scaling of the displacement vector and wherein the transformation is determined in an optimization method which minimizes deviation of the progressions from the transformed displacement vectors to determine parameters of the transformation including the at least one translation and the scaling factor.

2. The system of claim 1, wherein the position sensor for determination of the position data comprises a global positioning sensor.

3. The system of claim 1, wherein the proper motion sensor for determination of the proper motion data comprises a revolutions per minute sensor of at least one wheel.

4. The system of claim 1, wherein as starting position for the optimization method, the progression of displacement vectors is configured so that a first displacement vector corresponds to at least one of a first position datum or a last position vector corresponds to a last position datum.

5. The system of claim 1, wherein deviations differently weighted at different points of the progression of the position data are taken into consideration.

6. The system of claim 5, wherein weighting is based on at least one of: points measured earlier in time are weighted less strongly than points measured later in time; or weighting occurs with a weighting factor dependent upon a confidence value associated with each position datum.

7. The system of claim 1, wherein outliers in the progression of the position data are identified and not taken into consideration in the determination of the transformation at least one of before or during the determination of the transformation using a random sample consensus (RANSAC) algorithm.

8. The system of claim 1, wherein parameters that describe the transformation are smoothed via several consecutive determinations of the transformation including by formation of a sliding average.

9. The system of claim 1, wherein the transformation is newly determined in cyclic repetitions in response to new position data availability.

10. The system of claim 1, wherein the defined time period is selected to have at least one of: a length of 20 to 40 seconds; or 100 to 500 position data points in the defined time period.

11. The system claim 1, wherein the control apparatus is further configured to output the current position of the motor vehicle to a computer area network (CAN) bus for use by a navigation system.

12. A method for determining a current position of a motor vehicle in a geodetic coordinate system from a time series of first geodetic position data, the method comprising: recording the time series of first geodetic position data from a position sensor associated with a global navigation satellite system; recording proper motion data from at least one proper motion sensor; and determining, by a control apparatus, the position by applying a transformation including at least one rotation and at least one translation into the geodetic coordinate system to a displacement vector of the motor vehicle, which is derived from the most current proper motion data starting from a reference time to which the transformation relates, wherein the transformation is determined in the context of a regression analysis as optimal mapping of a progression of displacement vectors determined over a defined time period onto a progression of the position data determined for the same time period, and wherein the transformation comprises a scaling of the displacement vector and wherein the transformation is determined in an optimization method which minimizes deviation of the progressions from the transformed displacement vectors to determine parameters of the transformation including the at least one translation and the scaling factor.

13. The method of claim 12, wherein the position sensor for determination of the position data comprises a global positioning sensor.

14. The method of claim 12, wherein the proper motion sensor for determination of the proper motion data comprises a revolutions per minute sensor of at least one wheel.

15. The method of claim 12, wherein as starting position for the optimization method, the progression of displacement vectors is configured so that a first displacement vector corresponds to at least one of a first position datum or a last position vector corresponds to a last position datum.

16. The method of claim 12, further comprising taking into consideration differently weighted deviations at different points of the progression of the position data.

17. The method of claim 16, wherein weighting comprises at least one of: weighting points measured earlier in time less strongly than points measured later in time; or weighting with a weighting factor dependent upon a confidence value associated with each position datum.

18. The method of claim 12, wherein outliers in the progression of the position data are identified and not taken into consideration in the determination of the transformation at least one of before or during the determination of the transformation using a random sample consensus (RANSAC) algorithm.

19. The method of claim 12, further comprising smoothing parameters that describe the transformation via several consecutive determinations of the transformation by formation of a sliding average.

20. The method of claim 12, wherein the transformation is newly determined in cyclic repetitions in response to new position data availability.

21. The method of claim 12, wherein the defined time period is selected to have at least one of: a length of 20 to 40 seconds; or 100 to 500 position data points in the defined time period.

22. The method of claim 12, further comprising outputting the current position of the motor vehicle to a computer area network (CAN) bus for use by a navigation system.

* * * * *